Aug. 3, 1937.  W. G. HOFFMAN  2,089,026
TEMPERATURE COMPENSATED RETORT END
Filed Oct. 19, 1936  2 Sheets-Sheet 2
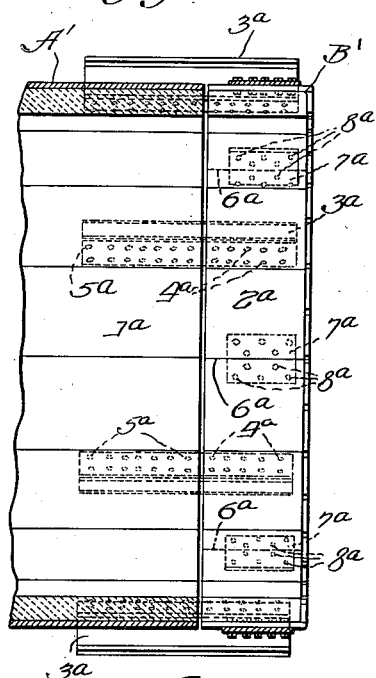
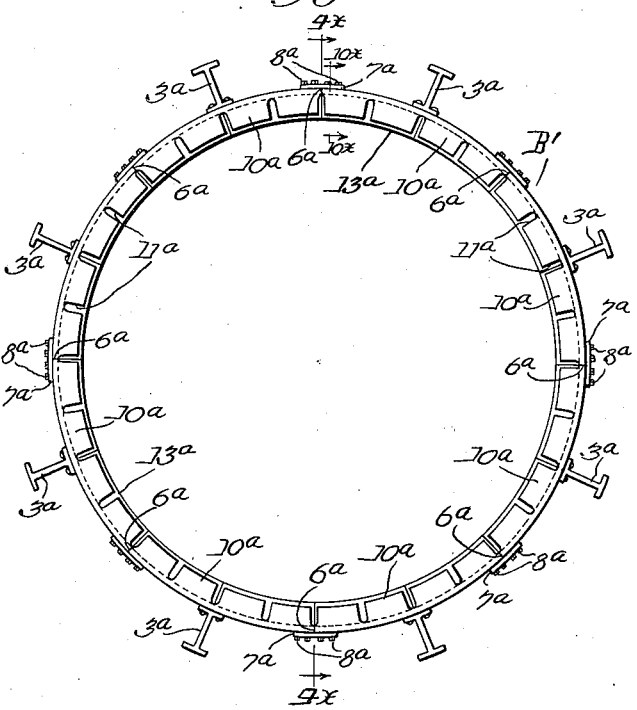
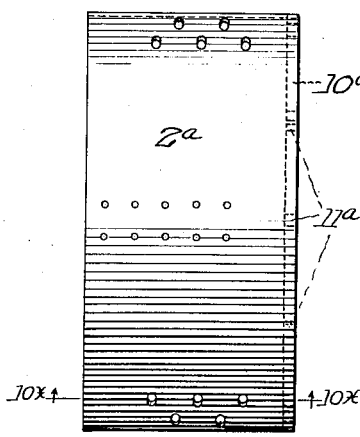
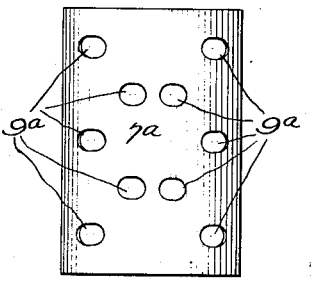
Inventor:
Walter G. Hoffman
By Wilkinson, Huxley, Byron & Knight
Attys.

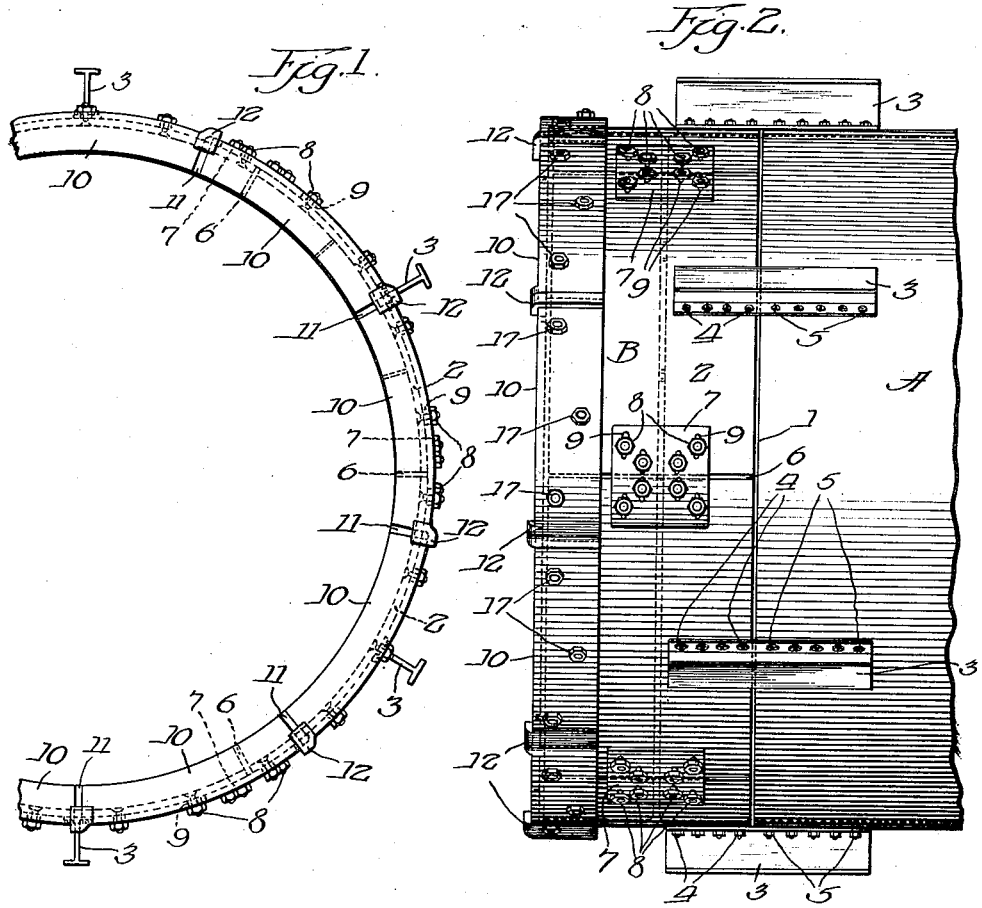

Patented Aug. 3, 1937

2,089,026

UNITED STATES PATENT OFFICE 2,089,026

TEMPERATURE COMPENSATED RETORT END

Walter G. Hoffman, Chicago, Ill., assignor to American Manganese Steel Company, Chicago Heights, Ill., a corporation of Maine Application October 19, 1936, Serial No. 106,385

10 Claims. (Cl. 263—33)

This invention relates to a retort or other high temperature apparatus involving in its construction an annular wall, one portion of which, in use, is subjected to heat to a degree that renders difficult the retention of the form and structural characteristics essential to the service which it is to perform.

One object of the invention is to so construct such high temperature apparatus or a portion or portions thereof that they will be able to withstand these deteriorating influences.

Another object is to so construct an annular confine or high temperature apparatus having a brick or refractory lining, that the said confine will be self compensating under extreme temperatures to which it is subjected in use, and thereby enabled to retain its form and structure and confine its lining against displacement.

Still another object of the invention is to provide a high temperature apparatus of the kind herein contemplated, with a confine, for instance, a rotary cylinder that is subdivided transversely into two sections, namely, a main section providing the body of the confine which by reason of certain conditions which it encounters in service is preferably given a physical structure of one kind, and an end section which, while supported by and constituting a continuation of the body section, is best adapted to meet temperature conditions which it encounters by giving it a radically different construction and particularly a construction involving subdivision of its walls into segmental members relatively movable to compensate for thermal expansion and contraction.

The invention, while primarily intended for embodiment in so-called nose rings or discharge ends of limestone burners, cement kilns and other retorts, is applicable to metal confines in general which encounter excessive temperatures in service, and it will therefore be alluded to herein, generally, as an annular hot zone confine.

The invention proceeds upon the principle of subdividing an annular alloy or other metal confine into separately formed segments assembled seriatim in the annulus of the confine, supported in said annulus with freedom of circumferential expansion and contraction, articulated in a manner to prevent departure from annular alignment in their said expansion and contraction, and suspended from the body portion of the structure through means which leaves the individual members of the annulus with comparative freedom to respond to the aligning influence of their articulating means notwithstanding distorting stresses of a high order imposed upon said members by temperature changes.

The invention further contemplates, in addition to these characteristics, a special construction and arrangement of liner confining means which will themselves remain amenable to alignment retention by the articulating means, not only without impairment but with safeguarding of their function of holding in place the refractory lining which enables the confine as a whole to withstand the heat.

In the accompanying drawings, in which two embodiments of the invention are disclosed by way of illustration—

Figures 1 and 2 are, respectively, a partial end elevation and a partial side elevation of one embodiment of the invention.

Figure 3 is a longitudinal section of the upper portion of Figures 1 and 2 in the plane of their vertical diameter and on an enlarged scale.

Figure 4 is a section on the line 4x—4x of Figure 5.

Figure 5 is an end elevational view of a retort embodying the invention but differing in details from the embodiment shown in Figures 1 to 3, and on a smaller scale.

Figures 6 and 7 are side and end views of one of the component segments of the end shown in Figures 4 and 5.

Figures 8 and 9 are end and plan views of a splice plate used for holding in circumferential alignment the meeting ends of two segments such as shown in Figures 6 and 7; and Figure 10 is a sectional view on an enlarged scale of parts shown at the left-hand end of the horizontal diameter of Figure 5 and in the corresponding portion of Figure 4.

Referring to Figures 1 to 3 inclusive, A represents a body portion and B the end ring or hot zone of a retort such as a lime or cement burner, said body portion being defined by a cylindrical wall 1 and said hot zone or ring being subdivided into a circumferential series of segments 2 individually supported from the cylindrical wall 1 by means of longitudinally extending splicing members, for instance, beams 3 secured to the ring segments by bolts 4 and to the body portion by bolts 5. The meeting ends of segments 2 are spaced apart as indicated at 6 and spliced together and held in circumferential alignment by plates 7 which are left in control of the segments by the location of the supporting beam 3 of each segment at the middle of the segment. Segments 2 are also left free to expand and contract under temperature variations by the introduction of their securing bolts 8 through holes 9 elongated in the circumferential direction of the ring.

It is customary to use refractory lining in retorts of the kind selected for illustration. The portion of the lining associated with the ring B of the present invention is preferably developed through means of bricks 13, 14 conforming to the internal confine of the ring and on opposite sides of an intermediate stiffening flange or fin 15, while the lining of the body A, shown at Y, may be of brick-work or plastic molded in situ. To assist in confining the brick 13 within the ring B, the end of said ring is provided with a confining flange 10 extending radially inward, and this flange 10 is also subdivided in radial planes as indicated at 11 for the purpose of dissipating distorting stresses at high temperatures; the spaced ends of these flange sections being lapped one upon another through means of a lip 12 formed integrally with one of the meeting ends at each point of separation.

In the form of the invention shown in Figures 1, 2, and 3, confining flanges 10 are mounted upon segments 2 through means of plates 16 conforming to the circumference of the segments, to which said plates are secured by bolts 17. The interruptions 11 in the brick confining flanges 10 are not coincident with the separations 6 between the segments 2 but are offset from the latter so that the brick confining element, when made separately from the segments 2, can assist in maintaining alignment of the segments. Flanges 10 are preferably left easily removable and replaceable in order to facilitate locating the lining bricks.

The form of the invention shown in Figures 4 to 10, inclusive, corresponds largely with that described in connection with Figures 1, 2, and 3 and the elements of this second form, which find their counterparts in Figures 1, 2, and 3, are given similar reference characters together with an exponent. Thus, in Figures 4 to 10, inclusive, body member A' comprising shell 1a has ring B', comprising segments 2a, suspended from it through means of beams 3a, while plates 7a secured by bolts 8a provide splice joints at points 6a where the ends of the segments meet. Bolt holes 9a which receive the bolts 8a are, as shown more clearly in Figure 9, elongated in the direction of the circumference of the ring B' to permit expansion and contraction of the segments under the influence of changes in temperature.

The brick-confining flange 10a, in the form shown in Figures 4 to 10, is made integral and subdivided at point 6a with the segments 2a, while radial subdividing slots 11a are provided in this integral flange as a precaution against development of distorting stresses. Detail views of a segment are found in Figures 6 and 7, while an assembly of said segment, with its splicing plate 7a, is shown in section in Figure 10. 13a, in Figure 5, indicates lining brick.

The construction herein described may be used with special advantage at the end of a lime, cement or other retort where the hot gases and flame enter in the burning process; the parts, particularly of the hot zone ring B or B' are preferably made of heat resisting alloy; and the construction and arrangement of each segment, with its single line of support intermediate of its length, prevents torsional displacement of that segment in either direction without restricting expansion and contraction in the direction of the circumference of the ring, and the circular assembly of the segments will be accurately maintained.

I claim:

1. A retort or the like, comprising a body portion and a hot zone portion mounted upon and forming a continuation of said body portion; said hot zone portion having its entire wall structure, including its outer surface, composed of segments of heat resisting alloy each formed separately from and provided with independent means supporting it upon the body portion of the retort; said segments being left, by their supporting means, free for movement relatively one to another in the direction of the circumference of the retort.

2. A confine for retorts and the like as described in claim 1, in which the segments have connections between their opposed ends that yield to the segments in the circumferential direction of the annulus but resist relative movement of the segments in directions radial thereto.

3. A confine for retorts and the like as described in claim 1, in which the opposed ends of the segments have portions that meet in overlapping joints.

4. A confine for retorts and the like as described in claim 1, in which the meeting ends of the segments are provided with splice plates bridging the spaces therebetween and united with said segments through means of bolts passing through openings elongated in the direction of the circumference of the annulus.

5. A retort as described in claim 1, in which substantially the entire structure of the hot zone is separated from the body portion of the retort, and the means through which the segments of the hot zone are individually supported upon the body portion comprise members extending longitudinally of the retort and secured at their respective ends to said segments and to the body portion.

6. A confine for retorts and the like as described in claim 1, which confine includes means for mounting it upon the body of the retort; said means comprising a suspending beam for each segment independently of the other segments, secured to its segment on a line intermediate the ends of the segments and having a portion extending from the segment in the direction of the axis of the annulus and adapted for connection with the body of the retort.

7. A confine for retorts and the like as described in claim 1, the segments of which said confine are provided with independent flange sections upstanding radially from the respective segments and aligned in series as segments of an internal annular liner-confining flange.

8. An annular hot zone confine for retorts and the like, comprising separately formed segments assembled seriatim in the annulus of the confine and secured against displacement from said annulus while having freedom of relative movement in the direction of the circumference thereof, in response to temperature-induced dimensional changes; said confine being provided with an inwardly presented radial liner-confining flange; and said flange being formed separately from the segments of the confine and in segmental subdivisions individually secured to the confine.

9. An annular hot zone confine as described in claim 8, in which one end of each flange segment is provided with an integral portion that overlaps the opposed end of an adjacent flange section while permitting expansion and contraction movement between the flange sections in the direction of the annulus of the confine.

10. An annular hot zone confine for retorts and the like, comprising separately formed segments assembled seriatim in the annulus of the confine and secured against displacement from said annulus while having freedom of relative movement in the direction of the circumference thereof, in response to temperature-induced dimensional changes; said confine being provided with an inwardly presented radial liner-confining flange; said flange being formed separately from the segments of the confine and in segmental subdivisions individually secured to the confine; the planes of subdivision of the flange being circumferentially spaced from the planes of subdivision of the annulus; and the flange segments being thereby made to bridge the space between the ends of the segments of the annulus.

WALTER G. HOFFMAN.